United States Patent [19]

Subramanian et al.

[11] Patent Number: 4,563,339

[45] Date of Patent: Jan. 7, 1986

[54] PROCESS FOR THE PREPARATION OF MAGNESIUM CHLORIDE FOR USE AS AN ELECTROLYTE IN ELECTROLYTIC PRODUCTION OF MAGNESIUM METAL

[75] Inventors: Panchapagesa Subramanian, Kottaiyur; Arunachalam Selvakesavan, Karaikudi; Laguduva K. I. Srinivasan, Karaikudi; Poonamalle Srinivasadesikan, Karaikudi; Kadathur S. Srinivasan, Karaikudi; Gajavalli N. R. Kannan, Karaikudi; Somasundaram Sukumaran, Karaikudi; Narasimhan Rajagopalan, Karaikudi; Koyalmannam S. Dhandapani, Kandanur; Chanassery O. Augustin, Karaikudi; Thangaraj S. Devasahayam, Karaikudi; Srinivasa Srikantan, Karaikudi; Handady V. Udupa, Karnataka, all of India

[73] Assignee: Council of Scientific and Industrial Research, New Delhi, India

[21] Appl. No.: 586,811

[22] Filed: Mar. 6, 1984

[51] Int. Cl.$^4$ ............................. C01F 5/32; C01F 5/34
[52] U.S. Cl. .................................... 423/178; 423/168; 423/498
[58] Field of Search ............... 423/155, 178, 497, 498, 423/168; 23/304

[56] References Cited

U.S. PATENT DOCUMENTS 3,067,006 12/1962 Ebert et al. ..................... 423/498

FOREIGN PATENT DOCUMENTS 172079 1/1946 Japan.
 8686 3/1973 Japan.
582357 11/1946 United Kingdom ............... 423/497

Primary Examiner—John Doll
Assistant Examiner—Jeffrey E. Russel
Attorney, Agent, or Firm—Birch, Stewart, Kolasch & Birch

[57] ABSTRACT

In electrolytic production of magnesium metal the concentration of magnesium chloride in the bath is required to be replenished periodically or continuously. This magnesium chloride should be anhydrous and of certain specifications.

This invention provides a method for the production of such anhydrous magnesium chloride in a two-stage dehydration of magnesium chloride solution, the first step consisting of preparation of a fine powder from magnesium chloride with 0.5 to 1.5 molecules of water and about 4 to 10% magnesium oxide with or without alkali or alkaline earth metal chlorides, or both depending on the starting material. This first step is carried out in a conventional apparatus like the spray drier, briquetting the above partially dehydrated product in admixture with carbon powder under pressure to obtain compacted material such as briquettes of bulk density of 0.6 to 1.3 g/c.c., and size 1.5 to 5 cm. Second step comprises heating the above briquettes to a temperature of 200° to 350° C. in a current of chlorine gas for a period of 2 to 4 hours to obtain a completely dehydrated magnesium chloride with reduced magnesium oxide content suitable for electrolysis.

17 Claims, No Drawings

PROCESS FOR THE PREPARATION OF MAGNESIUM CHLORIDE FOR USE AS AN ELECTROLYTE IN ELECTROLYTIC PRODUCTION OF MAGNESIUM METAL

BACKGROUND OF THE INVENTION

The invention relates to improvements in or relating to the preparation of cell feed for the production of magnesium metal by molten salt electrolysis. The electrolytic production of magnesium metal consists in electrolysing alkali and alkaline earth metal chlorides or both in admixture with magnesium chloride in a fused state at temperatures around 700° C. As the electrolysis proceeds, magnesium chloride gets depleted. The concentration of the same in the bath is to be maintained by periodic addition of a cell feed consisting predominantly of dehydrated magnesium chloride which may or may not contain small quantities of alkali or alkaline earth chlorides which are required as make up quantities. For carrying out electrolysis efficiently, it is necessary that magnesium chloride in the cell feed should be free from water and the magnesium oxide content should be as low as possible.

The hitherto known processes are based on the adaptation of one of the following alternative methods:

(i) Use of partially dehydrated magnesium chloride of compositions varying between $MgCl_2.1.0$ to $1.5H_2O$, which could be produced by spray drying or step-wise evaporation and drying of magnesium chloride solutions in conventional evaporators followed by spray drying. The last traces of water get removed within the electrolytic cell. This process is being adopted by Messrs. Dow Chemical Co., U.S.A. and is reported in text books. However, use of partially dehydrated magnesium chloride directly in the cell reduces the current efficiency of the electrolysis to about 65 to 70% and results in a higher consumption of graphite anodes.

(ii) Use of completely anhydrous magnesium chloride as a cell feed produced by the chlorination of magnesium oxide in admixture with carbon at temperatures above 700° C. The magnesium oxide is produced from natural ores like magnesite or by calcining magnesium hydroxide $Mg(OH)_2$ precipitated from magnesium chloride solutions through the addition of an alkali. This process was adopted formerly by Messrs. Magnesium Electron Co. and later by Messrs. Narak Hydro of Norway. This process is also reported in textbooks. Such chlorination, however, is not suitable for direct adaptation where the raw material for magnesium production is a magnesium chloride source such as sea bitterns or inland brine.

(iii) Preparation of a completely anhydrous magnesium chloride cell feed by two-stage dehydration of magnesium chloride solutions wherein the partially dehydrated magnesium chloride with two molecules of water per molecule of magnesium chloride is prepared in a spray drier or in a prilling tower and subsequent removal of the last traces of moisture in the second stage consisting of either of the following alternatives:

(a) Drying the $MgCl_2.4$ to $6H_2O$ in a current of air and HCl. This procedure is currently being employed by Messrs. Narak Hydro (Norway). (British Pat. No. 1,329,718; German offen: No. 2,052,470—Messrs. Narak Hydro A.S.; German offen No. 2,053,189—Messrs. Narak Hydro A.S.; British Pat. No. 1,330,012).

Use of HCl gas in the second stage dehydration involves the use of special materials of construction for dealing with HCl vapour. Further, the regeneration of gaseous HCl (hydrogen chloride) in anhydrous form for recycling will be an expensive process due to the need for special materials of construction.

(b) Melting the partially dehydrated magnesium chloride with carbon at temperatures of the range of 600° to 700° C. and bubbling chlorine gas through the melt. This procedure is reported to be followed by Messrs. M. L. Industries, U.S.A. (U.S. Pat. No. 3,953,574—M. L. Industries).

The second-stage dehydration by bubbling chlorine in the partially dehydrated magnesium chloride kept in a molten state in a high temperature operation requiring additional energy for keeping the bath molten. The uniform distribution of chlorine in the molten bath and keeping the carbon uniformly distributed within the melt will present additional technological problems.

(c) Mixing $MgCl_2.5$ to $6H_2O$ with substances like ammonium chloride, iron oxide, ferric chloride etc. and heating it to temperatures of the range of 300° to 400° C. (Japanese Pat. No. 172,079, January 1946; Japanese Pat. No. 73,08,686).

The use of foreign materials like ammonium chloride, iron oxide, ferric chloride etc. in this process will not only be expensive but also likely to introduce new impurities in the cell feed.

The object of this invention is to obviate the above disadvantages by a simple process, wherein partially dehydrated magnesium chloride obtained by spray drying can be converted into a completely dehydrated product with a minimum contamination of magnesium oxide at a relatively low temperature of the order of 300° to 350° C. without the use of expensive equipment in highly corrosive HCl, so that such a product when used in magnesium electrolytic cells can yield current efficiencies about 80% with reduced graphite consumption.

The main advantages of the herein proposed invention are:

(i) The second-stage dehydration to obtain completely anhydrous magnesium chloride from $MgCl_2.0.5$ to $1.5H_2O$ is effected at a relatively low temperature so that no melting furnaces are required.

(ii) Simplicity in dehydration operation due to the avoidance of any special equipment to handle hydrogen chloride gas.

(iii) No foreign material which may introduce new impurities in the cell feed is utilized.

(iv) The hot chlorine gas from the electrolytic cell can be directly fed to a packed tower wherein the abovesaid second-stage dehydration can be done.

(v) Process could be adopted for magnesium chloride solutions obtained from sea or inland bitterns.

(vi) In view of the fact that the product obtained as a result of this process contains no moisture, it is possible to realize good current efficiencies of the order of 80 to 90% during the electrolysis with considerable reduction in the consumption of graphite anode during electrolysis.

It has been found that a compact mixture of carbon and partially dehydrated magnesium chloride under optimum sizes and porosity could be dehydrated at relatively low temperatures of the order of 300° C., with simultaneous chlorination of residual oxides resulting in the yield of moisture-free product with reduced magnesium oxide.

The invention may be considered to consist in a two-stage dehydration of magnesium chloride solution, the first step consisting of preparation of a fine powder from magnesium chloride with 0.5 to 1.5 molecules of water per molecule of magnesium chloride and about 4 to 10% by mole of magnesium oxide with or without alkali or alkaline earth metal chlorides or both depending on the starting material. This first step is carried out in a conventional apparatus like the spray drier, briquetting the above partially dehydrated product in admixture with carbon powder under pressure to obtain briquettes of bulk density of 0.6 to 1.3 g/cm$^3$, and size 1.5 to 5 cm. heating the above briquettes to a temperature of 200° to 350° C. in a current of chlorine gas for a period of 2 to 4 hours to obtain a completely dehydrated magnesium chloride with reduced magnesium oxide content suitable for electrolysis.

Following the procedure proposed in the herein invention by adopting the partially dehydrated magnesium chloride containing about 75 to 78% of magnesium chloride, 4 to 10% magnesium oxide and with or without sodium and/or potassium chlorides which may together be about 5 to 6% and about 12 to 15% water could be converted into a product containing 90 to 92% magnesium chloride with 1 to 2% magnesium oxide, with or without 4 to 6% sodium and/or potassium chloride (depending on the starting material), 0.8 to 2% insoluble carbon (which is not an impurity for the electrolysis) and with no moisture at all. All of the above compositions are on a molar basis.

The product so obtained is inexpensive, while making use of simple steps without the need for complicated and costly equipment.

This invention can be commercially adopted by passing anodic gases from the electrolytic cells through a vertical tower packed with briquettes of the above description to obtain the cell feed for electrolysis. The gases can be chlorine or chlorine in admixture with air or other gases which could be used for maintaining temperature.

Process can be used for dehydrating magnesium chloride solutions obtained from magnesite, sea water, sea bitterns or inland bitterns which may contain predominantly magnesium chloride with a concentration of 30% and above of MgCl$_2$ with or without smaller quantities (2 to 5%) of sodium and potassium chlorides on a molar basis.

Carbon used depending upon magnesium oxide content, is 2 to 10% by mole of the partially dehydrated magnesium chloride powder. In practice this range is 5 to 10%. The briquetting pressure can be 140 to 260 kg/sq.cm. generally up to 200 kg/sq.cm. Size of briquette obtained is 1.5 to 5 cm, preferably 2 to 4 cm. Heating under pressure at above mentioned temperatures may be continued for 2 to 4 hours, generally between 3.5 to 4 hours.

DESCRIPTION OF THE PREFERRED EXAMPLES

Example 1

Purified magnesium chloride solution obtained from sea bitterns containing 350 gpl of magnesium chloride, 20 gpl of sodium and potassium chlorides was spray dried to obtain a partially dehydrated magnesium chloride with 76.65% magnesium chloride, 5.09% magnesium oxide, 6.236% of sodium and potassium chloride and the remainder being H$_2$O, on a molar basis. This spray dried product mixed with 10% carbon was briquetted under 146 kg/sq.cm. pressure yielding a briquette of bulk density 0.7 g/cm$^3$. The briquette was heated in a tubular furnace to a temperature of 300° C. in a chlorine atmosphere for 3½ hours. The end product had the following compositions on a molar basis:

91.4% Magnesium chloride
2.0% Magnesium oxide
5.695% Sodium and potassium chlorides
0.8% Insolubles
Moisture Nil

Example 2

Purified magnesium chloride solution obtained from sea bitterns containing 350 gpl of magnesium chloride, 20 gpl of sodium and potassium chlorides was spray dried to obtain a partially dehydrated magnesium chloride with 77.41% magnesium chloride, 9.83% magnesium oxide, 6.12% sodium and potassium chlorides, and the remainder being H$_2$O, on a molar basis. This spray dried product mixed with 9% carbon was briquetted under 200 kg/sq.cm. pressure yielding a briquette of bulk density 1 g/cm$^3$. The above briquette was heated in a silica tubular furnace in a chlorine atmosphere to a temperature of 300° C. for 4 hours. The end product has the following composition on a molar basis:

92.36% Magnesium chloride
1.04% Magnesium oxide
4.10% Sodium and potassium chlorides
2.50% Insolubles
Mositure Nil

What is claimed is:

1. A process for the preparation of anhydrous magnesium chloride cell feed for use for electrolytic production of magnesium comprising a first stage partial dehydration of a purified magnesium chloride solution containing small quantities of chlorides of alkali or alkaline earth metals or both to obtain a partially dehydrated magnesium chloride powder of a composition MgCl$_2$, 0.5 to 1.5 molecules of H$_2$O, per molecule of MgCl$_2$ along with 4 to 8% by mole of magnesium oxide, followed by second stage dehydration wherein the partially dehydrated magnesium chloride obtained at the first stage is admixed and compacted with carbon and the compacted material is heated in a current of chlorine gas to obtain a completely anhydrous magnesium chloride containing over 90% magnesium chloride with less than 2% magnesium oxide and no moisture.

2. A process according to claim 1 wherein the partially dehydrated magnesium chloride powder obtained in the first stage is mixed with 2 to 10% by mole of carbon.

3. A process according to claim 1 wherein the mixture of magnesium chloride and carbon is compacted under a pressure of 140 to 260 kg/sq.cm. to obtain briquettes with bulk density of 0.6 to 1.3 g/cc.

4. A process according to claim 1 wherein the compacted material is heated in a current of chlorine gas to a temperature of 200° to 350° C., for a period of 2-4 hours.

5. A process for the preparation of anhydrous magnesium chloride cell feed for use for electrolytic production of magnesium comprising a two-stage dehydration of magnesium chloride solution, the first step consisting of preparation of a fine powder from magnesium chloride with 0.5 to 1.5 molecules of water per molecule of magnesium chloride and about 4 to 10% by mole of magnesium oxide with or without alkali or alkaline earth metal chlorides, or both, depending on the starting material, admixing and compacting the above partially dehydrated product with carbon powder, heating the above compacted material to a temperature of 200° to 350° C. in a current of chlorine gas for a period of 2 to 4 hours to obtain a completely dehydrated magnesium chloride with decreased magnesium oxide content suitable for electrolysis.

6. A process according to claim 2 wherein the mixture of magnesium chloride and carbon is compacted under a pressure of 140 to 260 kg/sq.cm to obtain briquettes with bulk density of 0.6 to 1.3 g/cc.

7. A process according to claim 2 wherein the compacted material is heated in a current of chlorine gas to a temperature of 200° to 350° C., for a period of 2–4 hours.

8. A process according to claim 3 wherein the compacted material is heated in a current of chlorine gas to a temperature of 200° to 350° C., for a period of 2–4 hours.

9. The process according to claim 5, wherein the partially dehydrated product which has been admixed and compacted with carbon powder is formed into briquettes under pressure.

10. The process according to claim 6, wherein the briquettes have a bulk density of 0.6 to 1.3 g/cc and a size of 1.5 to 5 cm.

11. The process according to claim 5, wherein the first step is carried out in a spray drier or prilling tower.

12. The process according to claim 3, wherein the carbon is compacted under a pressure of 140 to 200 kg/sq.cm pressure to obtain briquettes with bulk density of 0.6 to 1.3 g/cc.

13. The process according to claim 4, wherein the compacted material is heated in a current of chlorine gas to a temperature of 250° to 300° C. for a period of 3.5 to 4 hours.

14. The process according to claim 2, wherein the partially dehydrated magnesium chloride powder obtained in the first stage is mixed with 5–10% by mole of carbon.

15. The process according to claim 6, wherein the carbon is compacted under a pressure of 140 to 200 kg/sq.cm pressure to obtain briquettes with bulk density of 0.6 to 1.3 g/cc.

16. The process according to claim 7, wherein the compacted material is heated in a current of chlorine gas to a temperature of 250° to 300° C. for a period of 3.5 to 4 hours.

17. The process according to claim 8, wherein the compacted material is heated in a current of chlorine gas to a temperature of 250° to 300° C. for a period of 3.5 to 4 hours.

* * * * *